United States Patent [19]

Feterl

[11] Patent Number: 4,712,922
[45] Date of Patent: Dec. 15, 1987

[54] MATERIAL MIXING APPARATUS

[75] Inventor: Leon G. Feterl, Salem, S. Dak.

[73] Assignee: Core Industries Inc., Bloomfield, Mich.

[21] Appl. No.: 815,928

[22] Filed: Jan. 3, 1986

[51] Int. Cl.⁴ .............. B01F 7/08; B01F 7/14; B01F 15/02; B65G 33/26
[52] U.S. Cl. .................. 366/288; 366/186; 366/292; 366/297; 366/321; 366/603; 198/662; 198/676
[58] Field of Search ............. 366/186, 189, 287, 288, 366/292, 297, 298, 300, 321, 603; 198/662, 676; 241/101 B, 260.1

[56] References Cited

U.S. PATENT DOCUMENTS

| | | | |
|---|---|---|---|
| 471,337 | 3/1892 | Humphreys | 336/288 |
| 1,769,576 | 7/1930 | Haines | 336/271 |
| 2,676,002 | 4/1954 | Wolfe | 336/299 |
| 2,890,865 | 6/1959 | Costa et al. | 366/297 |
| 3,090,605 | 5/1963 | Copeland et al. | 366/298 |
| 3,430,924 | 3/1969 | Hosokawa et al. | 366/300 |
| 3,537,689 | 11/1970 | Ferguson, Jr. et al. | 366/297 |
| 3,672,640 | 6/1972 | Crose | 366/300 |
| 3,706,442 | 12/1972 | Peat | 366/298 |
| 3,746,314 | 7/1973 | Nauta | 366/287 |
| 3,790,138 | 2/1974 | Neier | 366/298 |
| 3,797,807 | 3/1974 | Behrens | 366/298 |
| 3,995,836 | 12/1976 | Carter et al. | 366/192 |
| 4,153,376 | 5/1976 | Neier | 366/298 |
| 4,298,289 | 11/1981 | Walley | 241/101 B |
| 4,380,398 | 4/1983 | Burgness | 366/298 |
| 4,447,158 | 5/1984 | Simon | 366/297 |
| 4,462,693 | 7/1984 | Buschbom et al. | 366/297 |
| 4,480,927 | 11/1984 | Peat et al. | 366/325 |
| 4,506,990 | 3/1985 | Neier et al. | 366/299 |
| 4,509,862 | 4/1985 | High et al. | 366/292 |

FOREIGN PATENT DOCUMENTS

| | | | |
|---|---|---|---|
| 71254 | 9/1915 | Australia | 366/297 |
| 1202765 | 10/1965 | Fed. Rep. of Germany | 366/300 |

Primary Examiner—Harvey C. Hornsby
Assistant Examiner—Joseph S. Machuga
Attorney, Agent, or Firm—Moore & Hansen

[57] ABSTRACT

An apparatus for mixing animal feeds and the like comprises a rotor having two opposing end assemblies connected by a center shaft for rotation within a mixer box. A flighted outer auger is mounted in the terminal portion of each set of corresponding radial arms of each end assembly, parallel to the center shaft. Each outer auger is rotated by drive means within the first hollow rotor end assembly, powered by a high speed drive shaft, and the entire apparatus is rotated by a low speed drive shaft. The drive shafts extend from opposing end assemblies and are coaxial to the center shaft. An optional center auger or optional intermediately spaced augers, parallel to the center shaft, are rotated by drive means within the second end assembly, driven by one or more outer augers.

35 Claims, 9 Drawing Figures

MATERIAL MIXING APPARATUS

BACKGROUND OF THE INVENTION

1. Field of the Invention

This invention relates generally to mixers, and more particularly to an apparatus for mixing particulate materials such as silage, meal, concentrates, grains, hay, and the like.

2. Information Disclosure Statement

Mixing devices are commonly used to mix animal feedstuffs prior to distribution at a feedlot. The feedstuffs may comprise various quantities of particulate materials which must be uniformly mixed to ensure uniform intake by the animals. The blending and mixing operation may take place at a central location from which the mixed material is distributed, but often the various ingredients are placed in a mobile mixing truck box or trailer and mixed enroute to final distribution.

An early apparatus for mixing animal feeds is shown in Haines U.S. Pat. No. 1,769,576. Material to be mixed is circulated by conveyor to a hopper in which rotating toothed rollers break up lumps and mix the feed material.

In Wolfe U.S. Pat. No. 2,676,002, feed materials are mixed in a wagon box just prior to discharge by two rotating mixing/beating elements, one above the other.

Copeland et al U.S. Pat. No. 3,090,605 discloses a feed mixer within a hopper apparatus for mixing animal feeds passing to an area of use or storage. Two fixedly mounted screws rotate to move material to one end of the hopper, while a third, lower screw rotates to move the material in the opposite direction and to exit via the hopper.

Similarly, the mixer in the feed wagon of Carter et al U.S. Pat. No. 3,995,836 comprises a plurality of fixed-position augers which move the material to be mixed in opposite directions.

Buschbom et al U.S. Pat. No. 4,462,693 shows a mixing box having two fixed lower augers and two fixed upper paddle conveyors. The paddle conveyors move particulate materials in a direction opposite that of the lower augers.

Neier U.S. Pat. No. 3,790,138 shows a mixing apparatus with two augers fixedly mounted in the lower portion of the wagon box to move material in opposing directions. Paddle agitators are located in the upper portion of the box. The auger flights are arranged to provide an area of mutual convergence adjacent a discharge opening. One drawback of such auger arrangement is that hay becomes wedged between the box wall and augers, exerting a destructive force on the drive mechanisms.

An agitator which turns on a longitudinal axis in a space comprising substantially the whole of the trailer body is shown in Walley U.S. Pat. No. 4,298,289. This large agitator sweeps material upward to a smaller secondary agitator on which are randomly arranged spines. The trailer box is emptied by discharge from an opening beneath the secondary agitation. Trailer contents are mixed by rotational tumbling rather than axial transfer. As a result, end-to-end mixing is extremely limited.

Crose U.S. Pat. No. 3,672,640 discloses a similar paddle-wheel type mixer except that the shaft of the main agitator supports one or more helical ribs to form an auger. As a fixed part of the main agitator assembly, the auger rotational speed is limited to that of the main agitator, severely reducing end-to-end mixing. In Crose, the secondary agitator comprises an auger for axial movement of the particulate materials in a side chamber and discharge therefrom.

Another feed mixer similar in configuration to the Walley and Crose patents is shown in Neier et al U.S. Pat. No. 4,506,990. The primary agitator or large rotor is of paddle wheel type construction with both fixed rotor bars and bars with spring-mounted wiper blades. A pair of secondary augers with opposing screw pitch are located in an auxiliary chamber having a discharge gate. End-to-end mixing depends upon spill-over of materials from the auxiliary chamber into the main chamber.

SUMMARY OF THE INVENTION

The primary object of this invention is to provide an apparatus which mixes animal feeds and the like to achieve uniformity of mixture in a short time.

Another object is to provide a uniform mixture with a minimum of expended energy.

A further object is to provide a mixing assembly which efficiently handles materials with a wide range of textures, particle sizes, and densities.

Another object is to provide a mixing assembly which handles a combination of materials including fibrous matter such as chopped hay.

Another object is to provide a mixing assembly adaptable to mobile or stationary mixing boxes.

Another object is to provide a mixing assembly which does not require a separate compartment in the mixing box for longitudinal mixing and/or discharge of material.

Another object of this invention is to provide a longitudinal mixing assembly requiring a minimum of shaft openings in the mixing box end walls.

A further object is to provide a mixing assembly with multiple augers in which the auger drive means are totally enclosed.

An additional object is to provide a mixing assembly which enables controlled, rapid, and complete discharge of the mixer box contents.

These and other objects and advantages are achieved in the instant material mixing apparatus for mobile or stationary mixer boxes. The apparatus includes two rotor end assemblies connected by a center shaft. Each rotor end assembly includes radially extending arms. A plurality of outer augers are spaced radially from the center shaft and parallel to it. The opposite ends of each outer auger shaft are rotatably mounted in corresponding arms of the rotor end assemblies.

The first rotor end assembly is hollow and encloses drive means for transferring rotational energy from a high speed drive shaft to each outer auger. The flights on the rotating augers move the material back and forth longitudinally within the mixing box.

A low speed drive shaft mounted on the second rotor end assembly turns the entire mixing apparatus, including center shaft, rotor end assemblies, and augers, in an orbit about the center shaft and coaxial drive shafts. The entire mixing assembly is supported on the drive shafts by bearings.

The orbiting outer augers produce both radial and circumferential movement of materials, which in combination with the cyclical longitudinal movement accomplishes thorough mixing in a short time with minimal energy consumption.

The material mixing apparatus of this invention comprises the following elements:

An elongated center shaft is rotatively driven about a longitudinal axis within a mixer box. One end of the center shaft is fixedly mounted transversely to a first rotor end assembly, with which it rotates. The first rotor end assembly is hollow and includes a plurality of hollow arms extending radially from it.

A second rotor end assembly is fixedly mounted transversely to the opposite end of the center shaft. The second rotor end assembly includes a plurality of arms extending radially therefrom corresponding in number to the arms on the first rotor end assembly.

A plurality of outer augers extend longitudinally within the mixer box, parallel to and radially spaced from the center shaft. Each outer auger comprises an elongated shaft with a helical flight or flights mounted fixedly on a portion thereof, to move material longitudinally by its rotation. Each shaft has one end rotatably mounted in the terminal portion of a hollow arm of the first rotor end assembly. The opposite end of each shaft is likewise mounted in the terminal portion of the corresponding arm of the second rotor end assembly.

Mounted within and projecting from the first rotor end assembly is a high speed drive shaft, coaxial with the center shaft.

Outer auger drive means is enclosed within the hollow portion of the first rotor end assembly, for transmitting rotational energy from the high speed drive shaft to the outer auger shafts, rotating the outer augers with respect to the mixing box.

A low speed drive shaft is fixedly mounted to the second rotor end assembly, coaxial with the center shaft. The low speed drive shaft turns the rotor end assemblies in unison, together with the plurality of outer augers mounted thereon. The outer augers circumscribe a circular orbit about the center shaft.

The high speed and low speed drive shafts are supported by bearing means attached to the mixer box.

DESCRIPTION OF THE PREFERRED EMBODIMENTS

The present invention is an improved mixing assembly for mixing and blending animal feedstuffs as well as other fluent and nonfluent materials. The assembly is installed in a mixer box which can be mounted on a mobile support such as a truck or trailer chassis, or the box can be stationary.

Figure 1:
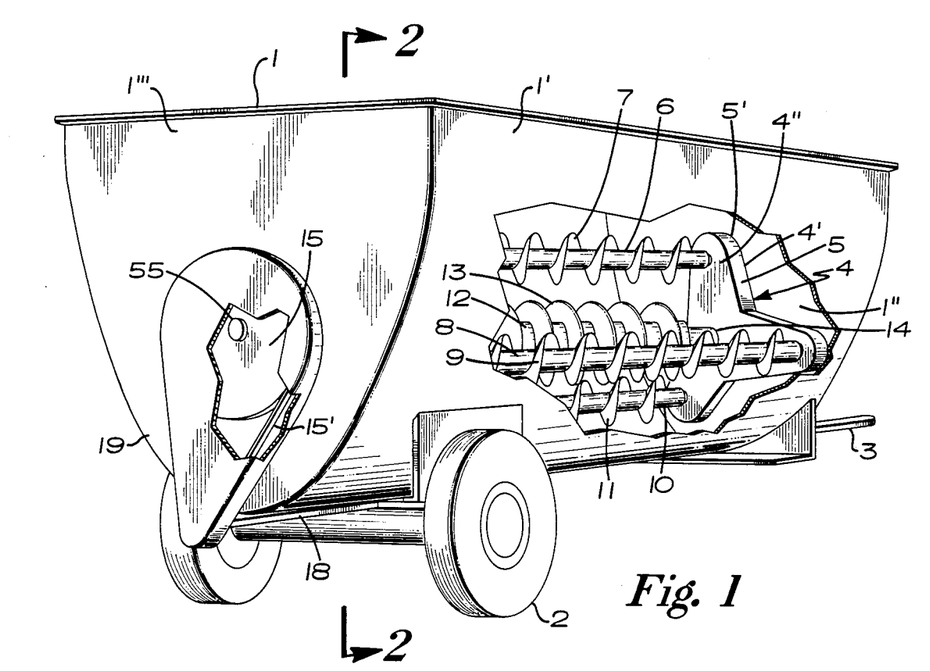
FIG. 1 is a perspective view of an embodiment of the material mixing assembly of the present invention, as mounted in a mobile mixing box.

FIG. 1 illustrates one embodiment of the invention as installed in a mobile trailer mixing box 1 such as used for mixing and dispensing animal feeds.

The mixer box 1 has first and second end walls 1" and 1"' and a side wall 1' which in this example extends cylindrically around both sides and the bottom of the mixing assembly. The walls establish the internal wall surfaces of the mixer box.

The mixer box is mounted on wheels 2 and includes a tongue 3 for attachment to a tractor or truck hitch. Thus, in this embodiment, several feed materials may be introduced into the mixer box and mixed by this invention to a uniform composition enroute to an animal feeding area.

Figure 2:
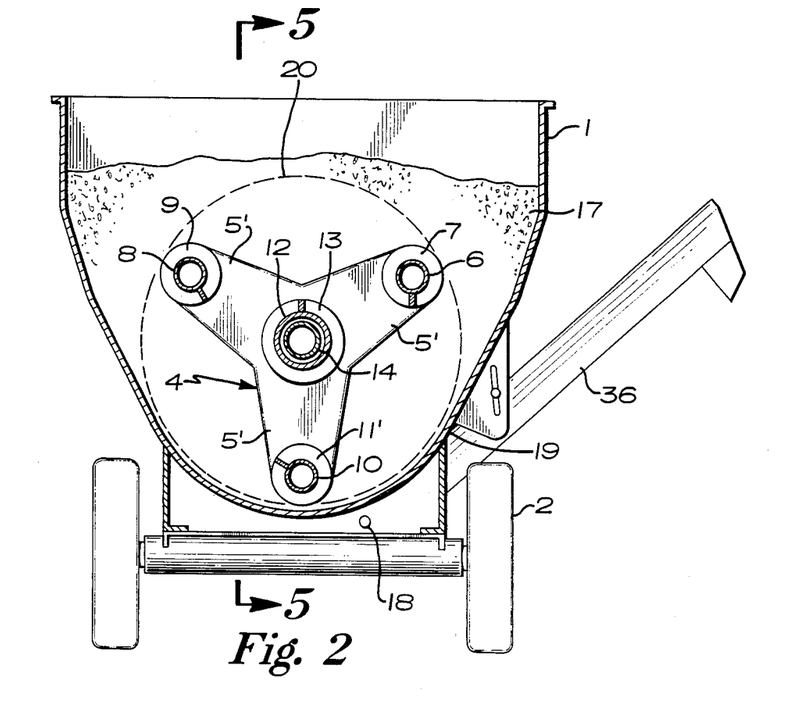
FIG. 2 is a partial sectional rear view taken along line 2—2 in FIG. 1.
Figure 3:
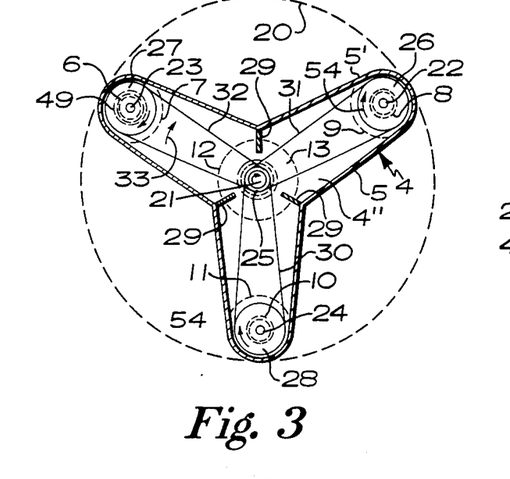
FIG. 3 is a partial sectional end view within the first hollow rotor end assembly.
Figure 5:
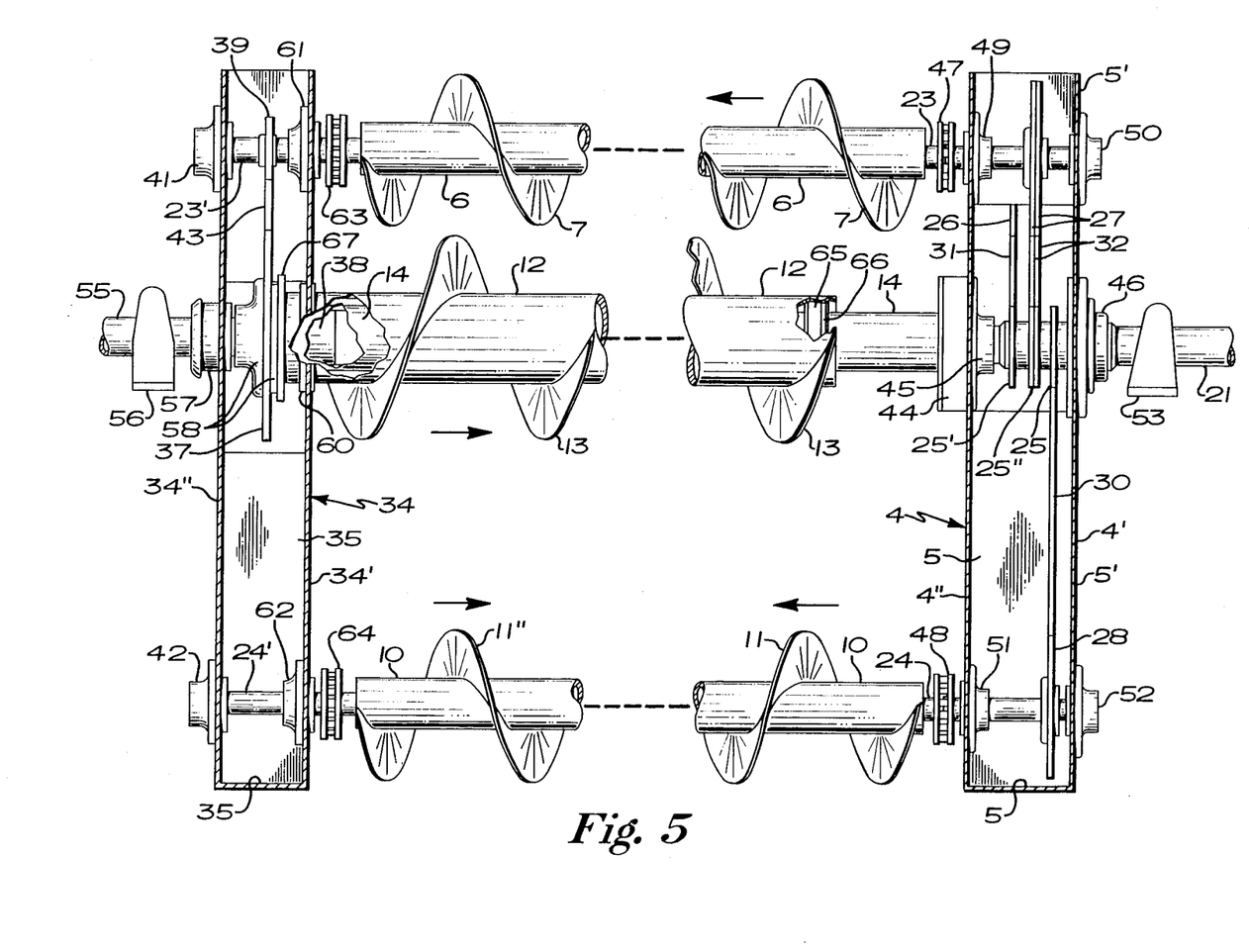
FIG. 5 is a partial sectional side elevation view of a preferred embodiment of the material mixing assembly.

As shown in FIGS. 1 and 2, the mixing apparatus includes an elongated center shaft 14 rotatably driven about a longitudinal axis within mixer box 1. A first rotor end assembly 4 is fixedly mounted transversely to one end of the center shaft, and rotates with it. The rotor end assembly 4 is hollow and includes a plurality of radially extending hollow arms 5'. As shown in FIGS. 3 and 5, rotor end assembly 4 includes an outer wall 4' transverse to the center shaft 14, corresponding inner wall 4" spaced from the outer wall 4', and peripheral wall 5 which joins the outer wall 4' and inner wall 4" at their periphery to form hollow rotor end assembly 4. Braces 29 or other braces may be incorporated to stiffen and strengthen the assembly. Access ports, not shown, may be included for ease of assembly and servicing.

Figure 4:
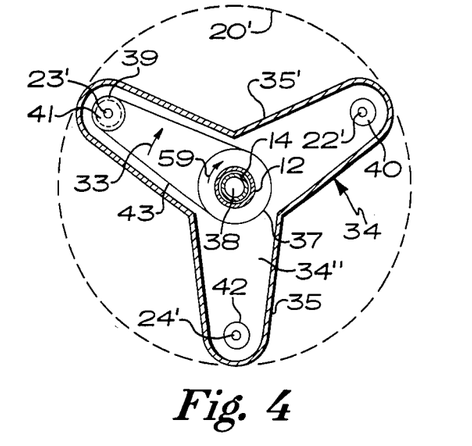
FIG. 4 is a partial sectional end view within a preferred embodiment of the second rotor end assembly.

A second rotor end assembly 34 shown in FIGS. 4 and 5 is fixedly mounted transversely to the opposite end of center shaft 14 and rotates with the shaft. Rotor end assembly 34 generally corresponds to the first rotor end assembly 4 and has the same number of radially extending arms 35. The center shaft 14 and rotor end assemblies 4 and 34, being fixedly joined, rotate as a unit.

A plurality of outer augers is comprised of one or more helical flights 7, 9, 11 fixedly mounted on elongated outer auger shafts 6, 8, 10, respectively, whose ends are rotatably mounted on the terminal portion of corresponding arms of the first and second rotor end assemblies 4 and 34. These augers, extending longitudinally within the mixer box 1, are parallel to and radially spaced from center shaft 14 and are termed "outer" augers to distinguish them from an optional center auger or optional intermediate augers located intermediate the center shaft 14 and the outer augers. When the first rotor end assembly 4 is rotated, the outermost portion of the outer augers describes a circumference of rotation 20, shown in FIGS. 2 and 3. Each outer auger is preferably turned in the same direction.

The flight or flights 7, 9, or 11 on each auger comprise helical ribs fixedly mounted on the auger shaft. The auger shaft may be solid or hollow, as a pipe shaft, and is circumscribed by the flight or flights which have suitable dimensions and pitch to achieve the desired material movement and mixing when rotated. The use of such augers to move materials is well known. Optional center auger 13 and intermediate augers 80, 81, 82 later described, are similarly constructed.

The lower portion 19 of side wall 1' shown in the embodiment of FIGS. 1 and 2 is rounded to an internal wall diameter slightly greater than the overall diameter of the mixing assembly, to provide close clearance between the outer augers and the internal wall. In the preferred embodiment, such clearance is less than 4 inches, and more preferably 0.25–1.5 inches, to prevent accumulation of materials on the internal wall surfaces of mixer box 1.

The mixing assembly is driven by two separate drive shafts, each coaxial with center shaft 14. One of the drive shafts, designated in FIGS. 3 and 5 as high speed drive shaft 21, is rotatably mounted in high speed drive shaft bearings 45 and 46 to rotate within first rotor end assembly 4. A drive means enclosed within the first rotor end assembly transmits rotational energy from the high speed drive shaft 21 to outer auger shafts 6, 8, 10, causing their rotation with respect to mixer box 1. In the embodiment shown in FIGS. 3 and 5, the drive means within the first rotor end assembly is a chain drive. Sprocket wheels 25, 25', 25" are fixedly mounted on high speed drive shaft 21. Likewise, a sprocket wheel 26, 27, or 28 is mounted fixedly on each outer auger shaft 6, 8, and 10 within the first rotor. Preferably, the end portions 22, 23, and 24 of outer auger shafts 6, 8, and 10 including the portions within rotor end assembly 4 to which sprocket wheels 26, 27, and 28 are mounted, are reduced in diameter. The portions of auger shafts 6, 8, and 10 on which helical flights 7, 9, and 11 are mounted are shown as hollow "pipe" shafts, but are alternatively solid.

As illustrated in FIG. 3, an endless drive chain 30 mounted on and between sprocket wheels 25 and 28 transmits rotational energy from the high speed drive shaft 21 to outer auger shaft 10. Similarly, endless drive chain 31 mounted on and between sprocket wheels 25' and 26 transmits rotational energy from drive shaft 21 to outer auger shaft 8, and endless drive chain 32 mounted on and between sprocket wheels 25" and 27 transmits rotational energy to outer auger shaft 6. More than one drive chain and sprocket wheel may be used to motivate an outer auger, depending upon the load. In the embodiment shown in FIG. 5, two drive chains 32, 32 rotate outer auger shaft 6 and attached sprocket wheels 27, 27, in order to provide additional rotational power for rotating center auger pipe shaft 12 through outer auger shaft 6. The number and sizes of chains required may be calculated from a knowledge of the forces exerted on the drive components by the mixing operations.

The diameters of sprocket wheels 25, 25', and 25" and 26, 27, and 28 are such that the rotational speed of high speed drive shaft 21 produces the desired outer auger speed. Thus, in the example of FIG. 3, sprocket wheel diameters are provided which produce an outer auger RPM: drive shaft RPM ratio of 0.5. A PTO (power takeoff) driving the high speed drive shaft at 90 RPM will result in an outer auger speed of 45 RPM.

As shown in FIG. 5, the preferred rotatable mounting of each outer auger shaft 22, 23, and 24 is through the use of two bearings. For example, shaft 23 is mounted in bearing 49 attached to inner wall 4" and in bearing 50 attached to outer wall 4'. The use of two bearings for mounting each outer auger shaft within first rotor end assembly 4 is necessary because each shaft is driven therein. Two bearings are required to absorb unbalanced radial driving forces on the shafts.

Turning now to the second rotor end assembly 34 in which the opposite ends of outer auger shafts are mounted, FIG. 4 shows an internal cross-sectional view of the assembly with its outer wall 34" and peripheral wall 35. The second rotor end assembly has arms 34' which correspond generally to the arms 5' of first rotor end assembly 4. Each of the outer auger shafts 6, 8, and 10 has an end portion 22', 23', or 24' of reduced diameter which is rotatably mounted in the terminal portion of one of the arms 35'. The mounting comprises two bearings, one on inner wall 34' and one on outer wall 34" for each outer auger shaft. Thus, as shown in FIG. 5, reduced portion 23' of outer auger shaft 6 is rotatably mounted in bearings 41 and 61. Shaft 8 is similarly mounted in bearings 40 and 61', and shaft 10 is mounted in bearings 42 and 62. As further shown in FIG. 5, the inner wall 34' is joined to outer wall 34" by peripheral wall 35 to produce a hollow end assembly having space enclosing a drive means for delivering rotational energy to a center auger pipe shaft 12. Braces (not shown) may be used to stiffen and strengthen the end assembly, similar to braces 29 illustrated for the first rotor end assembly 4 in FIG. 3. The bracing may be either within or on the exterior of the end assembly, or located in both places, depending on strength requirements.

As shown in FIG. 5, center shaft 14 is a hollow pipe shaft fixedly attached to an inner end portion 38 of low speed drive shaft 55. Typically, end portion 38 has an outer diameter which matches the inner diameter of shaft 14 in which it is inserted and joined by welding. As shown in this figure, drive shaft 55 is fixedly joined to a collar 57, typically by welding, and the collar is, in turn, joined to outer wall 34" of the second end assembly. The two rotor end assemblies are thus fixedly joined to the center shaft 14 and low speed drive shaft 55, and the entire apparatus rotates about the center shaft, supported by bearing means 53 on high speed drive shaft 21 and bearing means 56 on low speed drive shaft 55. Preferably, such bearing means comprise bearings mounted on opposing end walls 1" and 1''' of mixer box 1.

The embodiment of this invention shown in FIGS. 1–5 also includes a center auger comprising a helical flight or flights 13 mounted fixedly on an elongated center auger pipe shaft 12. Shaft 12 rotates coaxially about the smaller center shaft 14 between the first and second rotor end assemblies 4 and 34. At the shaft end closest to the first rotor end assembly, bearing 65 and seal 66 separate the center auger shaft 12 from center shaft 14. At its other end, shaft 14 is shown fixedly attached to flange 67, for example by welding. The flange is attached rigidly to bearing 58, for example by bolts, and center auger shaft 12 freely rotates about center shaft 14, having support at each end on bearings 65 and 58, respectively. Center auger seal 60 prevents mixed material 17 from entering second hollow rotor end assembly 34.

The drive means by which center auger shaft 12 is rotated is shown in FIGS. 4 and 5 as a chain drive. Sprocket wheel (or wheels) 39 is fixedly mounted on one or more outer auger shafts 23' within the second hollow rotor end assembly. Sprocket wheel (or wheels) 37 is fixedly mounted on center auger pipe shaft 12, either directly or through the rigidly attached bearing 58 or flange 67. Endless drive chain 43 is mounted on and between sprocket wheels 37 and 39 to transfer rotational energy from the high speed drive shaft 21 through one or more outer auger shaft 6 to rotate the center auger.

In the most general embodiment, all augers are outer augers, i.e. they are mounted in the terminal portion of arms 5' and 35'. As a result, all drive means are within first hollow rotor end asssmbly 4, and second rotor end assembly may be either hollow or generally solid in form. In this case, the form of construction will depend upon ease of construction, cost factors, weight restrictions and strength requirements. Without a center auger, center shaft 14 and coaxial low speed drive shaft 55 may be fixedly attached to both the outer wall 34" and the inner wall 34', when a hollow end assembly is used. A generally solid second rotor end assembly may optionally be used, and each pair of auger shaft bearings 40 and 61', 41 and 61, 42 and 62, may be replaced by a single shaft bearing. Thus, bearings 41, 41', and 42 may be eliminated.

As shown in FIG. 5, each outer auger shaft incorporates two flexible shaft couplings, one at each end of the shaft between the flighted portion and the rotatably mounted end portion. Thus, outer auger shaft 6 includes, as part of its reduced diameter section 23, flexible coupling 47. At its opposite end, reduced diameter section 23' includes flexible coupling 63. Preferably, each outer auger shaft and intermediate auger shaft, if used, includes flexible shaft couplings in similar fashion. No flexible coupling is required by center auger pipe shaft 12.

The terms "high speed" and "low speed" are applied to drive shafts 21 and 55 in a relative sense. The rotational speed of the outer augers will, under most circumstances, exceed that of the apparatus as a unit, by a factor of 4–100. Thus, for mixing animal feeds, the apparatus as shown in FIG. 5 may rotate, as a whole, at about 1–5 RPM while the outer augers rotate at 30–60 RPM. The particular auger speeds used will depend upon the materials being mixed, the pitch of the auger flights, auger diameter, and the material movement which is desired.

Figure 6:
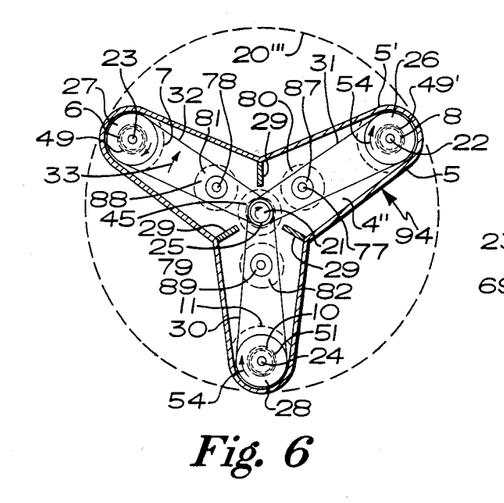
FIGS. 6 and 7 are partial sectional end views of a modified embodiment of the first and second rotor end assemblies, respectively.
Figure 7:
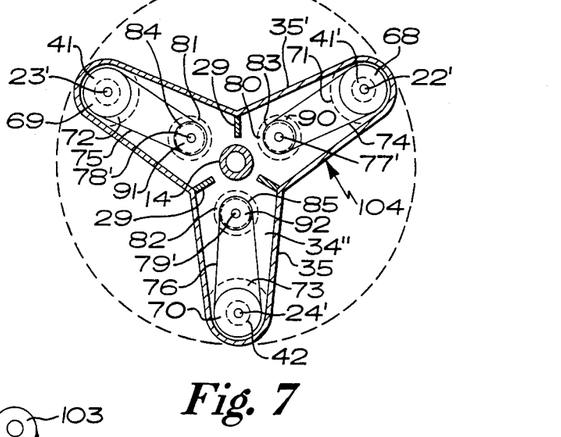

A further embodiment illustrated in FIGS. 6 and 7 incorporates a plurality of intermediate augers 80, 81, and 82 which extend longitudinally within the mixer box. The intermediate augers can be viewed as taking the place of the center auger, but provide additional high shear zones for faster mixing.

The intermediate augers are constructed like the outer augers, each comprising an elongated intermediate auger shaft with a helical flight or flights fixedly mounted on a portion thereof, to move material longitudinally. Each intermediate auger parallels the center shaft 14 and is radially spaced therefrom, intermediate in distance between the center shaft and a corresponding parallel outer auger.

In FIG. 6, the exemplary first rotor end assembly 94 is as previously described, but additionally includes bearing means for the plurality of intermediate auger shafts. Thus, intermediate auger shaft 78 to which auger 81 is fixedly mounted, is shown rotatably mounted in bearing 88 in inner wall 4". Likewise, shaft 77 carrying auger 80 is mounted in bearing 87, and shaft 79 carrying auger 82 is mounted in bearing 89. Although a single bearing in wall 4" for supporting each shaft may be sufficient for light loads, shafts 77, 78, and 79 are each preferably mounted in two bearings as are the outer auger shafts. Thus, like the outer auger shafts, each intermediate auger shaft is supported by both the inner wall 4" and outer wall 4' of the first rotor end assembly 94.

The drive means within the first end assembly is as previously described. Each of the outer auger shafts 22, 23, and 24 is rotated by high speed drive shaft 21 through a chain drive.

A cross-sectional view of second rotor end assembly 104 is shown in FIG. 7. The hollow end assembly is formed of outer wall 34" and inner wall 34', joined at their periphery by peripheral wall 35, as previously described. The reduced portion 22', 23', and 24' of each outer auger shaft 6, 8, and 10 is rotatably mounted in bearings 41, 41', and 42 in the terminal portion of an arm of the end assembly, as shown previously. Center shaft 14 is fixedly attached to the end assembly and is aligned with low speed drive shaft, previously described.

Like the outer augers, intermediate augers 80, 81, and 82 have shafts 77', 78', and 79' which are rotatably mounted in bearings 90, 91, and 92. These bearings are mounted on outer wall 34". Like the outer auger shafts, the intermediate shafts are also mounted in bearings, not shown, attached to inner wall 34', so that each auger shaft is supported by two bearings at each end.

A drive train is enclosed within second rotor end assembly 104 by which rotational energy from each outer auger shaft is transmitted to a corresponding intermediate auger shaft for turning the intermediate augers.

The preferred drive means shown in FIG. 7 is a chain drive. A sprocket wheel 68, 69, or 70 is fixedly mounted on each outer auger shaft 22', 23', or 24' to rotate therewith. Likewise, a sprocket wheel 83, 84, or 85 is fixedly mounted on each corresponding intermediate auger shaft 77', 78', and 79'. An endless drive chain is mounted on and between each set of corresponding sprocket wheels and transmits rotational energy from the outer auger shaft to the intermediate auger shaft. Thus, chain 74 is mounted on sprocket wheels 69 and 84, and chain 76 is mounted on sprocket wheels 70 and 85. Thus, the high speed drive shaft 21 drives each outer auger through drive means enclosed in the first rotor end assembly, and each outer auger, in turn, drives a corresponding intermediate auger through drive means enclosed within the second rotor end assembly. As previously described, the apparatus is rotated in orbit by the low speed drive shaft fixedly attached to both end assemblies.

Figure 8:
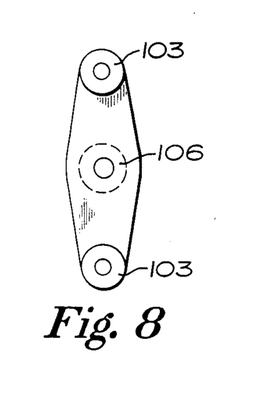
FIGS. 8 and 9 are partial end views of rotor end assemblies having two and four arm-mounted outer augers, respectively.
Figure 9:
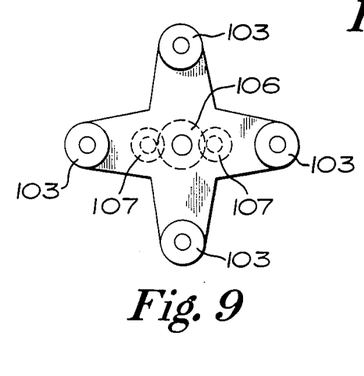

Each of the particular examples of this invention described and illustrated thus far shows three outer augers mounted on rotor end assemblies having three arms. However, the invention encompasses a plurality of rotor end assembly arms, outer augers and optional intermediate augers. The preferred number comprising the plurality is 2–6, and more preferably 3. FIGS. 8 and 9 are simplified sectional illustrations of rotor end assemblies for embodiments having 2 and 4 outer augers 103, respectively, mounted on the terminal portions of the arms. An optional center auger 106 or alternatively, optional intermediate augers 107 are as indicated. Preferably, the plurality of outer augers corresponds in number to the plurality of hollow arms on the first rotor end assembly and to the number of hollow arms on the second rotor end assembly. For the embodiment with intermediate augers, the number of such augers is preferably the same as the number of outer augers.

In each of the embodiments described, the motivating power to rotate the low speed drive shaft 55 and high speed drive shaft 21 will typically be a tractor or truck engine PTO (power take off). The PTO drives input jack shafts which are connected to the drive shafts. Other power sources such as electrical or gasoline engines may be used. The particular power source is unimportant as a part of this invention, as long as sufficient power is provided for turning both drive shafts at the required rotational speed.

As will be described later, special advantage can be taken of this invention when the rotational speed of each drive shaft is controlled independently. Any available control means may be used. Means to stop the orbital rotation of the apparatus when a discharge outer auger with opposed flights attains a nadir position allows the mixing box to be emptied completely from a discharge location intermediate the first and second rotor end assemblies.

The mixing action provided by this apparatus is unique in several aspects. Prior art mixers either (a) induce longitudinal movement of material by augers rotating in a stationary location, or (b) produce a gross circular motion of the bulk material by the slow rotation of a large rotor assembly. Although some prior art mixers incorporate augers in one chamber or zone and a rotor in an attached chamber or zone, none utilize coextensive mixing by both methods within a single mixing chamber. As a result, the box contents may be well-mixed, indeed, overly-mixed, in some zones and under-mixed in other zones.

The present invention uses a plurality of outer augers, integrally part of the rotor assembly, which traverse an orbit about the center shaft. As a result, material movement is (a) back and forth in a longitudinal direction, (b) generally circular in the vertical plane, and (c) spiral in nature due to the combined motion of the augers.

Ideal mixing action results when every individual particle of material is exposed at an interface to material to which it has not been previously exposed, or to which it has been least exposed. This interface is the meeting place of materials moving in opposing or otherwise different directions, or at differing velocities and comprises a zone of low-to-high shear forces. Nearly-ideal mixing may be achieved by the use of a large number of closely spaced augers, mounted to move materials along each of the X, Y, and Z coordinate directions, to create high shear throughout the mixing box. Complex drive systems and excessive power requirements make such mixers impractical. Moreover, space occupied by the augers and drive mechanisms severely reduce the useful capacity of the box.

The present invention approaches an ideal mixing pattern more closely, using rotating augers which continuously orbit through the materials and create moving zones of high shear which rapidly pass through a large portion of the materials in each coordinate direction. Areas of undermixed material and/or overmixed material are avoided, and the energy requirements are reduced.

One of the advantages of this invention is that the auger flights may be adapted to provide a wide variety of mixing patterns.

The flight or flights may be helically mounted to move material in either longitudinal direction, or may be mounted in an opposed configuration, a portion of the auger constructed to move material in one direction, and a second portion of the auger constructed to move material in the opposite direction.

At least one outer auger 10 is preferably flighted to move material to a location where it is discharged from mixer box 1, for example, by a material discharge conveyor 36 as shown in FIG. 2. The discharge location is generally most conveniently located intermediate the two rotor end assemblies. The preferred location is between 30 percent and 70 percent of the longitudinal distance from the first rotor end assembly to the second rotor end assembly. Thus, for example, where the opening to the discharge conveyor 36 is midway between the rotor end assemblies, one outer auger 10 will have opposed flights 11 and 11' mounted to move material from both ends of the mixing box toward the central discharge location.

When all augers are outer augers, there being no central or intermediate augers, the flight or flights on one or more augers are preferably constructed to move material in a longitudinal direction opposite that of at least one of the remaining outer augers. Accumulation of material at any location in the mixing box is thus prevented.

When the mixing apparatus includes a center auger 12 or intermediate augers such as 80, 81, 82 of FIG. 6, many variations of flight mounting are possible, including:

(a) Excluding discharge outer auger 10 with opposed flights 11, 11', the outer augers are constructed to move material to one end of the mixing box, while the center or intermediate augers move material to the opposite end.

(b) Excluding discharge outer auger 10, one or more outer augers moves material to one end of the mixing box while the remaining outer auger(s) move material to the opposite end. Each intermediate auger moves material in a direction opposite that of the outer auger on the same arm. Thus the set of augers on each arm produces its own circulation pattern, and the set of augers on the adjacent arm produces a similar circulation pattern but in the opposite direction.

(c) An opposing set of flights is mounted on each auger similar to that of outer auger 10 and flights 11, 11' shown in FIG. 5. For example, all outer augers move material from each end of the mixing box toward an intermediate location. The center auger, or alternatively, the intermediate auger flights are also opposed, but in the reverse direction, in order to move material from the intermediate location toward each end of the mixing box.

Thus, the set of augers on each arm produces two circulating patterns. An advantage of this embodiment is that the opposing flights on each auger result in balanced thrust forces on the auger shaft bearings 49–52, 41, 42, 61 and 62. Thrust forces on the drive shaft bearings including bearings 45, 46, 53, and 56 are also reduced by this opposed flight arrangement. A further advantage is that fresh material is continuously moved to the intermediate discharge location, and when the material in the box is discharged to a low level, material is no longer moved away from the discharge location. Thus, the orbital motion of the mixer may be continued during the entire discharge operation, if desired. Where only one of the outer augers has opposed flights to move material to the discharge location, it is preferable to stop orbital rotation of the mixer when such "discharge" auger is in the nadir orbital position, to ensure that the mixer box is completely emptied.

The intermediate location created by the opposing flights on the intermediate augers or center auger need not be identical to the intermediate discharge location created by the opposing flights on the outer augers.

What is claimed is:

1. A material mixing apparatus for a mixer box, comprising:
   an elongated center shaft rotatively driven about a longitudinal axis within said mixer box;
   a first rotor end assembly fixedly mounted transversely to one end of said center shaft for rotation therewith, said first rotor end assembly being hollow and comprising a plurality of hollow arms extending radially therefrom;

a second rotor end assembly fixedly mounted transversely to the opposite end of said center shaft for rotation therewith, said second rotor end assembly including a plurality of hollow arms extending radially therefrom corresponding in number to said plurality of hollow arms of said first rotor end assembly;

a plurality of outer augers extending longitudinally within said mixer box, parallel to and radially spaced from said center shaft, each said outer auger comprising an elongated outer auger shaft having a helical flight means fixedly mounted on a portion thereof to move said material longitudinally, said outer auger shafts having one end rotatably mounted in the terminal portion of a hollow arm of said first rotor end assembly and the opposite end rotatably mounted in the terminal portion of the corresponding arm of said second rotor end assembly;

a high speed drive shaft rotatably mounted within and projecting from said first rotor end assembly;

outer auger drive means enclosed within said first rotor end assembly for transmitting rotational energy from said high speed drive shaft to said outer auger shafts to rotate said outer augers with respect to said mixer box;

a low speed drive shaft fixedly mounted to said second rotor end assembly and coaxial with said center shaft for rotation of said first and second rotor end assemblies in unison, together with said plurality of outer augers mounted thereon, in an orbit about said center shaft; and bearing means attached to said mixer box for supporting said high speed drive shaft and said low speed drive shaft within said mixer box.

2. The material mixing apparatus according to claim 1, wherein said outer auger drive means within said first rotor end assembly is a chain drive, further comprising:

a plurality of sprocket wheels fixedly mounted on said high speed drive shaft for driving each said outer auger shaft;

a plurality of outer auger sprocket wheels, each fixedly mounted on one of said outer auger shafts; and a plurality of endless drive chains, each mounted on and between one of said sprocket wheels mounted on said high speed drive shaft and a corresponding sprocket wheel mounted on one of said outer auger shafts, to transmit rotational energy from said high speed drive shaft to each of said outer auger shafts to rotate each said outer auger with respect to said mixer box.

3. The material mixing apparatus according to claim 1, wherein said plurality of outer augers comprises 2-6 augers.

4. The material mixing apparatus according to claim 1, wherein said plurality of outer augers comprises three augers.

5. The material mixing apparatus according to claim 1, wherein said plurality of outer augers corresponds in number to said plurality of hollow arms on said first rotor end assembly and to said plurality of arms on said second rotor end assembly.

6. The material mixing apparatus according to claim 1, wherein said helical flight means fixedly mounted on at least one of said outer auger shafts is mounted to move said material in a longitudinal direction opposite that of said flight means on at least one of the remaining outer augers.

7. The material mixing apparatus according to claim 1, wherein said flights fixed on each of one or more of said plurality of outer auger shafts comprises opposed flights to move material longitudinally from both ends of said mixer box to a discharge location intermediate said first and second rotor end assemblies, where said material is discharged from said mixing box.

8. The material mixing apparatus according to claim 1, further comprising a flexible shaft coupling at each end of each said outer auger shaft, said shaft couplings flexibly mounted between flighted portions on said outer auger shafts and each said rotatably mounted end of said outer auger shaft.

9. The material mixing apparatus according to calim 1, wherein the lower portion of said mixer box is arcuate in cross-section and rounded to an internal diameter slightly greater than the overall diameter of said mixing apparatus, to provide less than four inches clearance between said outer augers and the internal wall surface of said lower portion of mixer box.

10. The material mixing apparatus according to claim 1, wherein said bearing means for supporting said drive shafts includes a first bearing mounted on one end wall of said mixing box for supporting said high speed drive shaft, and a second bearing mounted on the opposing end wall of said mixing box for supporting said low speed drive shaft.

11. The material mixing apparatus according to claim 1, wherein each said drive shaft is rotatively driven by a separate input jack shaft.

12. A material mixing apparatus for a mixer box, comprising:

an elongated center shaft rotatively driven about a longitudinal axis within said mixer box;

a first hollow rotor end assembly fixedly mounted transversely to one end of said center shaft for rotation therewith, said first rotor end assembly including a plurality of hollow arms extending radially therefrom;

a second hollow rotor end assembly fixedly mounted transversely to the opposite end of said center shaft for rotation therewith, said second rotor end assembly including a plurality of hollow arms extending radially therefrom corresponding in number to said plurality of hollow arms of said first rotor end assembly;

a plurality of outer augers extending longitudinally within said mixer box, parallel to and radially spaced outwardly from said center shaft, each said outer auger comprising an elongated outer auger shaft having helical flight means fixedly mounted on a portion thereof to move said material longitudinally, said outer auger shafts having one end rotatably mounted on the terminal portion of a hollow arm of said first rotor end assembly and the opposite end rotatably mounted on the terminal portion of the corresponding hollow arm of said second rotor end assembly;

a center auger comprising helical flight means fixedly mounted on an elongated center auger pipe shaft for coaxial rotation about said center shaft between said first and second rotor end assemblies;

a high speed drive shaft rotatably mounted within and projecting from said first rotor end assembly;

outer auger drive means enclosed within said first rotor end assembly for transferring rotational energy from said high speed drive shaft to said outer augers to rotate said outer augers with respect to said mixer box;

center auger drive means enclosed within said second rotor end assembly for transferring rotational energy from one or more of said outer augers to said center auger pipe shaft to rotate said center auger with respect to said mixer box;

a low speed drive shaft fixedly mounted to said second rotor end assembly for rotation of said first and second rotor end assemblies in unison, together with said plurality of outer augers mounted thereon, in an orbit about said center shaft; and bearing means for supporting said high speed drive shaft and said low speed drive shaft within said mixer box.

13. The material mixing apparatus according to clai 12, wherein said drive means within first hollow rotor end assembly and second hollow rotor end assembly are chain drives, furtehr comprising:
- a plurality of sprocket wheels fixedly mounted on said high speed drive shaft within said first rotor end assembly for driving each of said plurality of outer augers;
- a sprocket wheel fixedly mounted on each said outer auger shaft within said first rotor end assembly;
- a plurality of endless drive chains within said first rotor end assembly, each mounted on and between one of said sprocket wheels on said high speed drive shaft and a sprocket wheel mounted on an outer auger shaft within said first rotor end assembly, to transfer rotational energy from said high speed drive shaft to each of said outer auger shafts to rotate said outer augers;
- sprocket wheel means fixedly mounted on said center auger pipe shaft within said second hollow rotor end assembly;
- a sprocket wheel fixedly mounted on at least one of said outer auger shafts within said second hollow rotor end assembly; and
- an endless drive chain mounted on and between said sprocket wheel on said outer auger shaft within said second hollow rotor end assembly and a corresponding sprocket wheel means mounted on said center auger pipe shaft within said second hollow rotor end assembly, to transfer rotational energy from said high speed drive shaft through at least one outer auger shaft to rotate said center auger.

14. The material mixing apparatus according to claim 12, wherein said plurality of outer augers comprises two - six augers.

15. The material mixing apparatus according to claim 12, wherein said plurality of outer augers comprises three augers.

16. The material mixing apparatus according to claim 12, wherein said plurality of outer augers corresponds in number to said plurality of hollow arms on said first rotor end assembly and to said plurality of hollow arms on said second rotor end assembly.

17. The material mixing apparatus according to claim 12, wherein said outer augers and center auger rotate in the same direction.

18. The material mixing apparatus according to claim 12, wherein said helical flight means fixedly mounted on at least one of said outer auger shafts is mounted to move said material in a longitudinal direction opposite that of at least one of the remaining said outer augers.

19. The material mixing apparatus according to claim 12, wherein said helical flight means on each said outer auger is mounted to move material in a longitudinal direction opposite that of said center auger.

20. The material mixing apparatus according to claim 12, wherein said flight means mounted on one or more of said plurality of outer auger shafts comprises opposed flights to move material longitudinally from both ends of said mixer box to a discharge location intermediate said first and second rotor end assemblies, where said material is discharged from said mixing box.

21. The material mixing apparatus according to claim 20, further comprising control means to stop rotation of said low speed drive shaft when one of said outer augers having opposed flights attains a nadir orbital position, said outer augers continuing to rotate to discharge said material from said mixing box at said discharge location.

22. The material mixing apparatus according to claim 12, further comprising a flexible shaft coupling at each end of each said outer auger shaft, said shaft couplings being flexibly mounted between a portion of each said outer auger shaft having flight means thereon and each said rotatably mounted end of said outer auger shafts.

23. The material mixing apparatus according to claim 12, wherein the lower portion of said mixer box is arcuate in cross-section and rounded to an internal diameter slightly greater than the overall diameter of said mixing apparatus, to provide less than four inches clearance between said outer augers and the internal wall surface of said lower portion of mixer box.

24. The material mixing apparatus according to claim 12, further comprising speed control means on said high speed drive shaft and low speed drive shaft whereby rotational speed of said low speed drive shaft is controlled independently from the rotational speed of said high speed drive shaft.

25. The material mixing apparatus according to claim 12, wherein said bearing means for supporting said drive shafts includes a first bearing mounted on one end wall of said mixing box for supporting said high speed drive shaft, and a second bearing mounted on the opposing end wall of said mixing box for supporting said low speed drive shaft.

26. The material mixing apparatus according to claim 12, wherein each of said drive shafts is rotatively driven by a separate input jack shaft.

27. The material mixing apparatus according to claim 12, wherein said helical flight means fixedly mounted on a portion of each said outer auger comprise opposed flights to move said material from both end walls of said mixer box to a location intermediate said first and second rotor end assemblies, and said helical flights fixedly mounted on a portion of said center auger comprise opposed flights to move said material from a location intermediate said first and second rotor end assemblies toward both end walls of said mixer box.

28. The material mixing apparatus according to claim 27, wherein said location intermediate said first and second rotor end assemblies is between thirty percent and seventy percent of the longitudinal distance from said first rotor end assembly and said second rotor end assembly.

29. The material mixing apparatus according to claim 1, further comprising:
- a plurality of intermediate augers extending longitudinally within said mixer box, parallel to said center shaft and outwardly spaced therefrom in a radial direction at locations radially intermediate said center shaft and said outer augers, each said intermediate auger comprising an elongated intermediate auger shaft having a helical flight means fixedly mounted on a portion thereof to move said material longitudinally, said intermediate auger shafts having one end rotatably mounted on an intermediate portion of said hollow first rotor end assembly and the opposite end rotatably mounted on a corresponding intermediate portion of said hollow second rotor end assembly; and intermediate auger drive means enclosed within said second rotor end assembly for transmitting rotational energy from said outer augers to said intermediate auger shafts to rotate said intermediate augers with respect to said mixer box.

30. The material mixing apparatus according to claim 29, wherein said intermediate auger drive means within said second rotor end assembly is a chain drive, further comprising: a plurality of sprocket wheels, each fixedly mounted on one of said outer auger shafts for rotation therewith;

plurality of sprocket wheels, each fixedly mounted on one of said intermediate auger shafts; and a plurality of endless drive chains, each mounted on and between one of said sprocket wheels mounted on said outer auger shafts within said hollow second rotor end assembly and a corresponding sprocket wheel mounted on one of said intermediate auger shafts, to rotate each said intermediate auger with respect to said mixer box.

31. The material mixing apparatus according to claim 29, wherein said flight means mounted on one or more of said plurality of outer auger shafts comprise opposed flights to move material longitudinally from both ends of said mixer box to a discharge location intermediate said first and second rotor end assemblies, where said material is discharged from said mixing box, and said flight means mounted on one or more of said plurality of intermediate auger shafts comprise opposed flights to move material from a location intermediate said first and second rotor end assemblies toward said first and second rotor end assemblies.

32. The material mixing apparatus according to claim 31, wherein each said intermediate auger shaft having opposed flights mounted thereon is rotatably mounted in a plane formed by the axis of said center shaft and the axis of one of said outer auger shafts having opposed flights mounted thereon, and parallel to said outer auger shaft.

33. The material mixing apparatus according to claim 29, wherein said helical flight means fixedly mounted on a portion of each said outer auger comprise opposed flights to move said material from both end walls of said mixer box to a location intermediate said first and second rotor end assemblies, and said helical flight means fixedly mounted on a portion of each said intermediate auger comprise opposed flights to move said material from a location intermediate said first and second rotor end assemblies toward both end walls of said mixer box.

34. The material mixing apparatus according to claim 33, wherein said location intermediate said first and second rotor end assemblies is between thirty percent and seventy percent of the longitudinal distance from said first rotor end assembly to said second rotor end assembly.

35. The material mixing apparatus according to claim 29 wherein said helical flight means on said outer auger shafts are constructed and arranged to move material longitudinally within said mixing box in the opposite longitudinal direction from the material movement caused by the helical flight means on said intermediate augers.

* * * * *